United States Patent
Watanabe

(10) Patent No.: US 11,608,538 B2
(45) Date of Patent: Mar. 21, 2023

(54) COATING AGENT FOR LEATHER, AND LEATHER ON WHICH COATING BY COATING AGENT IS FORMED

(71) Applicant: NISSIN CHEMICAL INDUSTRY CO., LTD., Echizen (JP)

(72) Inventor: Kentaro Watanabe, Echizen (JP)

(73) Assignee: NISSIN CHEMICAL INDUSTRY CO., LTD., Echizen (JP)

( * ) Notice: Subject to any disclaimer, the term of this patent is extended or adjusted under 35 U.S.C. 154(b) by 420 days.

(21) Appl. No.: 16/756,034

(22) PCT Filed: Oct. 23, 2018

(86) PCT No.: PCT/JP2018/039327
§ 371 (c)(1),
(2) Date: Apr. 14, 2020

(87) PCT Pub. No.: WO2019/082882
PCT Pub. Date: May 2, 2019

(65) Prior Publication Data
US 2020/0239972 A1 Jul. 30, 2020

(30) Foreign Application Priority Data

Oct. 24, 2017 (JP) .............................. JP2017-205056

(51) Int. Cl.
| | | |
|---|---|---|
| C08F 283/12 | (2006.01) | |
| C09D 175/04 | (2006.01) | |
| C14C 11/00 | (2006.01) | |
| C09D 7/42 | (2018.01) | |
| D06N 3/08 | (2006.01) | |

(52) U.S. Cl.
CPC ........ *C14C 11/006* (2013.01); *C08F 283/126* (2013.01); *C09D 7/42* (2018.01); *C09D 175/04* (2013.01); *D06N 3/08* (2013.01)

(58) Field of Classification Search
CPC ...... C14C 13/006; C09D 7/42; C09D 175/04; C08F 283/126
See application file for complete search history.

(56) References Cited

U.S. PATENT DOCUMENTS

| | | | | |
|---|---|---|---|---|
| 2006/0069198 | A1* | 3/2006 | Okuda ................ | C08F 283/124 526/201 |
| 2009/0005506 | A1* | 1/2009 | Shibata ................ | C08L 79/085 525/63 |
| 2010/0310882 | A1* | 12/2010 | Ogawa ................ | C09D 175/04 252/8.57 |
| 2015/0125500 | A1* | 5/2015 | Watanabe ............. | A61Q 19/00 424/401 |
| 2016/0177408 | A1 | 6/2016 | Watanabe | |

FOREIGN PATENT DOCUMENTS

| | | | |
|---|---|---|---|
| JP | 6-200300 | A | 7/1994 |
| JP | 2002-20438 | A | 1/2002 |
| JP | 2002020438 | A * | 1/2002 |
| JP | 2003-89749 | A | 3/2003 |
| JP | 2007-138326 | A | 6/2007 |
| JP | 2007-314919 | A | 12/2007 |
| JP | 2008-308785 | A | 12/2008 |
| JP | 2010-241963 | A | 10/2010 |
| JP | 2016-138242 | A | 8/2016 |

OTHER PUBLICATIONS

JP-2002020438_01-2002-English Translation.*
International Search Report, issued in PCT/JP2018/039327, PCT/ISA/210, dated Jan. 22, 2019.
Written Opinion of the International Searching Authority, issued in PCT/JP2018/039327, PCT/ISA/237, dated Jan. 22, 2019.

* cited by examiner

*Primary Examiner* — Michael L Leonard
(74) *Attorney, Agent, or Firm* — Birch, Stewart, Kolasch & Birch, LLP

(57) ABSTRACT

The present invention provides a coating agent for leather, the coating agent containing: in terms of solid content ratio, (I) an aqueous urethane resin; (II) a matting agent; and (III) a silicone acryl graft copolymer resin emulsion in which the weight ratio of a polyorganosiloxane represented by a specified formula relative to acrylic ester units or methacrylic ester units is 50:50 to 90:10, and a leather on which a coating by the coating agent for leather is formed. This coating agent for leather has exceptional wear resistance and anti-fouling properties, and a leather on which a coating by the coating agent is formed can maintain a high-quality external appearance and high wear resistance.

7 Claims, No Drawings

COATING AGENT FOR LEATHER, AND LEATHER ON WHICH COATING BY COATING AGENT IS FORMED

TECHNICAL FIELD

The present invention relates to a coating agent for leather, having wear resistance and anti-fouling properties, and a leather on which a coating by the coating agent is formed.

BACKGROUND ART

Conventionally, a leather such as a natural leather or a synthetic leather has been widely used for applications such as a car seat, furniture, clothes, shoes, a bag, sanitary goods, and outdoor tents. In a case where a leather is used in these applications, it is demanded for the leather to have excellent wear resistance and lubricity, and to take sufficient measures against dirt. In addition, a conventional resin composition used for a leather is often a solvent type resin composition using an organic solvent in order to improve a film forming property, but development of an aqueous composition has been promoted due to an effect on human bodies and the environment. Furthermore, in a case where coating is performed on a dark colored leather, if a coating film is whitened, the leather color is not sufficiently expressed. Therefore, a film that is not whitened is required.

As a method for improving wear resistance and lubricity of a leather, it is known to knead a silicone component such as a silicone oil or a silicone powder into a resin when the leather is manufactured. For example, JP-A 2007-138326 (Patent Document 1), in which acrylic-silicone copolymer particles are kneaded with a urethane-based elastomer to manufacture a synthetic leather, has succeeded in improving wear resistance. However, in this case, since the powder is kneaded into the resin, a manufacturing process is complicated. In addition, in order to obtain wear resistance, it is necessary to increase the amount of the acrylic-silicone copolymer particles added.

In order to solve this problem, there is a method for coating a surface of a leather such as a natural leather or a synthetic leather with a resin or the like. JP-A 2007-314919 (Patent Document 2) discloses that wear resistance is improved by coating an artificial leather with a surface finishing agent obtained by adding a crosslinking agent and a polyether-modified silicone to an aqueous polyurethane resin. However, in this case, the hydrophilicity of the surface finishing agent is strong. Therefore, there is a concern that anti-fouling properties of a surface of the leather are lost, for example, a liquid color migrates to the leather when a dark beverage or liquid such as coffee adheres to the leather, or a fiber color migrates to the leather when clothes are rubbed against the leather.

Furthermore, also as a method for improving the anti-fouling properties of a leather, a method for coating a surface of the leather with a resin or the like is known. JP-A 2010-241963 (Patent Document 3) discloses that an acrylic resin, an acrylic silica resin, an acrylic polysiloxane resin, a silicone-based tactile agent, and the like are compounded, and a natural leather is coated with the resulting mixture. JP-A 2008-308785 (Patent Document 4) discloses that a silicone resin film is formed on a surface of a synthetic leather made of a urethane resin. However, silicone has a low refractive index. The refractive index of silicone is largely different from that of a urethane resin or a vinyl chloride resin, and the film of silicone becomes cloudy and white disadvantageously. The present inventor also made studies on a silicone acryl graft copolymer resin emulsion in JP-A 2016-138242 (Patent Document 5) and discloses that the problem of whitening does not occur. However, an artificial leather itself is becoming lighter (thinner), and the thickness of a coating agent is increased in order to maintain strength, and the amount of silicone is increased in order to improve wear resistance. At this time, an external appearance is whitened disadvantageously.

PRIOR ART DOCUMENTS

Patent Documents

Patent Document 1: JP-A 2007-138326
Patent Document 2: JP-A 2007-314919
Patent Document 3: JP-A 2010-241963
Patent Document 4: JP-A 2008-308785
Patent Document 5: JP-A 2016-138242

SUMMARY OF INVENTION

TECHNICAL PROBLEM

The present invention has been achieved in view of the above circumstances, and an object of the present invention is to provide a coating agent for leather, having wear resistance, anti-fouling properties, and an anti-whitening function, and including an aqueous urethane resin, a matting agent, and a silicone acryl graft copolymer resin emulsion, and a leather on which a coating by the coating agent is formed.

SOLUTION TO PROBLEM

The present inventor has made intensive studies in order to achieve the above object. As a result, the present inventor has succeeded in development of a coating agent for leather, having wear resistance, anti-fouling properties, and an anti-whitening function by compounding a silicone acryl graft copolymer resin emulsion of the following component (III) with a coating agent containing an aqueous urethane resin and a matting agent, and a leather on which a coating by the coating agent is formed.

Therefore, the present invention provides the following coating agent for leather and a leather on which a coating by the coating agent is formed.

1. A coating agent for leather, the coating agent containing:
   in terms of solid content ratio,
   (I) 50 to 80% by weight of an aqueous urethane resin;
   (II) 10 to 40% by weight of a matting agent; and
   (III) 1 to 30% by weight of a silicone acryl graft copolymer resin emulsion in which the weight ratio of a polyorganosiloxane represented by the following formula (1) relative to acrylic ester units or methacrylic ester units is 50:50 to 90:10 (as a solid content):

[Chem. 1]

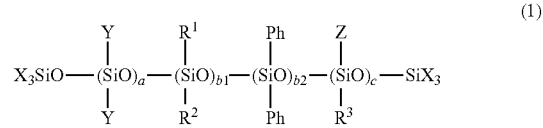

wherein $R^1$ and $R^2$ are identical or different and each represent a substituted or unsubstituted monovalent hydrocarbon group having 1 to 20 carbon atoms (excluding a phenyl group), Ph is a phenyl group, $R^3$ is a mercapto group-, acryloxy group-, or methacryloxy group-substituted alkyl group having 1 to 6 carbon atoms, or a vinyl group, X are identical or different and each represent a substituted or unsubstituted monovalent hydrocarbon group having 1 to 20 carbon atoms, an alkoxy group having 1 to 20 carbon atoms, or a hydroxyl group, Y are identical or different and each represent X or —[O—Si(X)$_2$]$_d$—X, at least two of X and Y being hydroxyl groups, Z is an alkyl group having 1 to 4 carbon atoms, an alkoxy group having 1 to 4 carbon atoms, or a hydroxyl group, "a" is a number of 0 to 1,000, "b1" is a positive number of 90 to 6,000, "b2" is a positive number of 1 to 4,000, "b1+b2" is a positive number of 91 to 10,000, "c" is a positive number of 1 to 50, and "d" is a positive number of 1 to 1,000.

2. The coating agent for leather according to the item 1, wherein the amount of diphenylsiloxane in the polyorganosiloxane represented by the general formula (1) is 15% by weight or more and 85% by weight or less.

3. The coating agent for leather according to the item 1 or 2, wherein
the silicone acryl graft copolymer resin emulsion (III) is an emulsion graft copolymer of:
(i) a polyorganosiloxane represented by the general formula (1);
(ii) an acrylic ester monomer or a methacrylic ester monomer; and
(iii) if necessary, a functional group-containing monomer copolymerizable with the component (ii).

4. The coating agent for leather according to any one of the items 1 to 3, wherein the aqueous urethane resin is a polycarbonate-based urethane resin.

5. The coating agent for leather according to any one of the items 1 to 4, wherein the matting agent is selected from silica, silicone powder, acrylic powder, and urethane powder.

6. The coating agent for leather according to any one of the items 1 to 5, wherein the silicone acryl graft copolymer resin emulsion has a solid content of 1 to 30% by weight and a viscosity of up to 500 mPa·s at 25° C.

7. A leather on which a coating by the coating agent for leather according to any one of the items 1 to 6 is formed.

ADVANTAGEOUS EFFECTS OF INVENTION

The coating agent for leather of the present invention has improved wear resistance and anti-fouling properties, and a leather on which a coating by the coating agent is formed can maintain a high-quality external appearance and high wear resistance. In addition, since the coating agent for leather is aqueous, the coating agent for leather has large advantages in terms of working and environment.

DESCRIPTION OF EMBODIMENTS

The present invention relates to a coating agent for leather containing:
(I) an aqueous urethane resin;
(II) a matting agent; and
(III) a silicone acryl graft copolymer resin emulsion, and
a leather on which a coating by the coating agent is formed.

The aqueous urethane resin (I) is a reaction product of a polyisocyanate and a polyol, and examples thereof include various water-soluble urethane resins using a polyether-based compound, a polycarbonate-based compound, a polyester-based compound, or the like as the polyol. In this case, the aqueous urethane resin used in the present invention has a viscosity (25° C.) of 5 to 700 mPa·s, preferably 10 to 500 mPa·s.

Examples of the polyether-based urethane resin include ADEKA BONTIGHTER HUX-350 manufactured by Adeka Corporation, WLS-201 and WLS-202 manufactured by DIC, and SUPERFLEX E-4000 and E-4800 manufactured by DKS Co. Ltd.

Examples of the polycarbonate-based urethane resin include HYDRAN WLS-210 and WLS-213 manufactured by DIC, UW-1005E and UW-5502 manufactured by Ube Industries, Ltd., PERMARIN UA-368 manufactured by Sanyo Chemical, Ltd., SUPERFLEX 460 and SUPERFLEX 470 manufactured by DKS Co. Ltd., and EDOLAN CM manufactured by Tanatex Chemicals Japan.

Examples of the polyester-based urethane resin include ADEKA BONTIGHTER HUX-380 and HUX-540 manufactured by Adeka Corporation, and SUPERFLEX 420 and SUPERFLEX 860 manufactured by DKS Co. Ltd.

Among these resins, the polycarbonate-based urethane resin is preferable.

The compounding amount of the aqueous urethane resin is 50 to 80% by weight, preferably 60 to 80% by weight as a solid content in the coating agent for leather. If the amount of the aqueous urethane resin is less than 50% by weight, coating properties such as wear resistance are extremely deteriorated disadvantageously. If the amount of the aqueous urethane resin exceeds 80% by weight, a surface is not smooth, and therefore a poor tactile sensation is given disadvantageously.

Examples of the matting agent (II) include silica, silicone powder, acrylic powder, and urethane powder. The matting agent is preferably silica which has good dispersibility in water and is inexpensive. Silica preferably has a pore volume of 0.2 to 2 ml/g. The silica more preferably has a pore volume of 0.6 to 2 ml/g. If the pore volume is less than 0.2 ml/g, the gloss of a leather treated with a coating composition cannot be eliminated. If the pore volume exceeds 2 ml/g, the wear resistance of the leather may be reduced disadvantageously.

The average particle size of silica is not particularly limited as long as the pore volume is in the range of 0.2 to 2 ml/g. Preferably the average particle size of silica is 1 to 10 μm, more preferably 1 to 8 μm. When the average particle size is 1 μm or more, the gloss can be eliminated from a surface of the leather without silica being buried in the leather. When the average particle size is 10 μm or less, silica can exhibit a function thereof without falling off from a surface of the leather. It is noted that the average particle size may be determined by particle size distribution measurement by the laser diffraction method.

Examples of a commercially available product include SYLOBLOC, SYLOID, and SYLOJET manufactured by Grace, SYLYSIA manufactured by Fuji Silysia Chemical Ltd., CARPLEX manufactured by DSL Japan, and SUNSPHERE manufactured by AGC Si-Tech Co., Ltd.

The compounding amount of the matting agent is 10 to 40% by weight; preferably 10 to 30% by weight as a solid content in the coating agent for leather. If the compounding amount of the matting agent is less than 10% by weight, a matting effect is hardly observed disadvantageously. If the compounding amount exceeds 40% by weight, a coating is whitened and the wear resistance of the coating is reduced disadvantageously.

The silicone acryl graft copolymer resin emulsion (III) is preferably obtained by subjecting a mixture including (i) a polyorganosiloxane represented by the following general formula (1), (ii) a (meth)acrylic ester monomer, and (iii) a functional group-containing monomer copolymerizable with the component (ii) to emulsion graft polymerization.

The silicone acryl graft copolymer resin emulsion (III) is preferably obtained using 100 parts by weight of the component (i), 10 to 100 parts by weight of the component (ii), and 0.01 to 20 parts by weight of the component (iii), and more preferably 40 to 100 parts by weight of the component (ii) and 0.01 to 5 parts by weight of the component (iii).

The polyorganosiloxane (i) has the following general formula (1).

[Chem. 2]

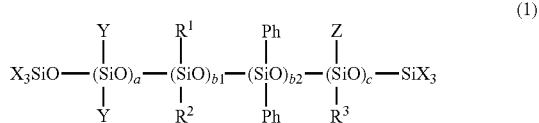

(1)

Here, in the above formula, $R^1$ and $R^2$ are identical or different, and each represent a substituted or unsubstituted monovalent hydrocarbon group having 1 to 20 carbon atoms (excluding a phenyl group). Ph is a phenyl group. Specific examples of the monovalent hydrocarbon group for $R^1$ and $R^2$ include: an alkyl group such as a methyl group, an ethyl group, a propyl group, a butyl group, a pentyl group, a hexyl group, a heptyl group, an octyl group, a nonyl group, a decyl group, a dodecyl group, a tetradecyl group, a hexadecyl group, or an octadecyl group; a cycloalkyl group such as a cyclopentyl group, a cyclohexyl group, or a cycloheptyl group; an alkenyl group such as a vinyl group or an allyl group; an aryl group such as a tolyl group or a naphthyl group; an alkenylaryl group such as a vinylphenyl group; an aralkyl group such as a benzyl group, a phenylethyl group, or a phenylpropyl group; an alkenylaralkyl group such as a vinylbenzyl group or a vinylphenylpropyl group; and groups in which some or all of hydrogen atoms of these groups are replaced with a halogen atom such as a fluorine atom, a bromine atom, or a chlorine atom, an acryloxy group, a methacryloxy group, a carboxyl group, an alkoxy group, an alkenyloxy group, an amino group, or an alkyl-, alkoxy-, or (meth)acryloxy-substituted amino group. $R^1$ and $R^2$ each preferably is a methyl group.

The weight of diphenylsiloxane of the polyorganosiloxane represented by the above formula was determined as follows. An arbitrary amount of the polyorganosiloxane represented by formula (1) was dissolved in hexane, and a calibration curve was prepared from an absorbance at a wavelength of 264.0 nm of a spectrophotometer. An oil from which moisture of the emulsion was sufficiently removed was dissolved in hexane, and the content of diphenylsiloxane was determined from the concentration of the resulting solution and the calibration curve. From a balance between whitening suppression and surface activity imparting, the amount of diphenylsiloxane is preferably 15% by weight or more and 85% by weight or less. Examples of the polyorganosiloxane represented by formula (1) include KF-50, KF-53, X-21-3265, KF-54, KF-56, HIVAC F-4, and HIVAC F-5 manufactured by Shin-Etsu Chemical Co., Ltd., SH510, SH550, and SH710 manufactured by Dow Corning Toray Co., Ltd., TSF-4300, TSF-437, and TSF-431 manufactured by Momentive Performance Materials, Inc.

$R^3$ is a mercapto group-, acryloxy group-, or methacryloxy group-substituted alkyl group having 1 to 6 carbon atom, or a vinyl group. Specifically, $R^3$ is preferably a mercaptopropyl group, an acryloxypropyl group, a methacryloxypropyl group, a vinyl group, or the like.

In the above formula, X is identical or different, and each represent a substituted or unsubstituted monovalent hydrocarbon group having 1 to 20 carbon atoms, an alkoxy group having 1 to 20 carbon atoms, or a hydroxyl group. Examples of the substituted or unsubstituted monovalent hydrocarbon group having 1 to 20 carbon atoms include similar groups to those exemplified for $R^1$. Specific examples of the alkoxy group having 1 to 20 carbon atoms include a methoxy group, an ethoxy group, a propoxy group, a butoxy group, a hexyloxy group, a heptyloxy group, an octyloxy group, a decyloxy group, and a tetradecyloxy group. Preferably, X is a hydroxyl group, a methyl group, a butyl group, or a phenyl group.

In the above formula, Y are identical or different, and each represent X or $-[O-Si(X)_2]_d-X$.

In the above formula, Z is an alkyl group having 1 to 4 carbon atoms, an alkoxy group having 1 to 4 carbon atoms, or a hydroxyl group, preferably represents a hydroxyl group or a methyl group.

In the above formula, if the subscript "a" is larger than 1,000, the strength of an obtained coating is insufficient. Therefore, "a" is a number of 0 to 1,000, preferably a number of 0 to 200. The subscript "b1" is a positive number of 90 to 6,000. The subscript "b2" is a positive number of 1 to 4,000, preferably a positive number of 5 to 500. If "b1+b2" is less than 91, the flexibility of a coating is poor. If "b1+b2" is larger than 10,000, a tear strength is reduced. Therefore, "b1+b2" is a positive number of 91 to 10,000, preferably a positive number of 1,000 to 5,000. The subscript "c" is a positive number of 1 to 50. If "c" exceeds 50, wear resistance is not improved disadvantageously when coating is performed on a leather. The subscript "d" is a positive number of 1 to 1,000, preferably a positive number of I to 200. In addition, it is preferable to use a compound having at least two, preferably 2 to 4 hydroxy groups at both ends in one molecule from a viewpoint of crosslinkability.

Such a polyorganosiloxane (i) is preferably used in a form of an emulsion. A commercially available polyorganosiloxane may be used, or a polyorganosiloxane may be synthesized. In the case of synthesis, the polyorganosiloxane (i) can be synthesized by a known emulsion polymerization method. For example, the polyorganosiloxane (i) can be easily synthesized by emulsifying and dispersing a cyclic organosiloxane optionally having a fluorine atom, a (meth) acryloxyl group, a carboxyl group, a hydroxyl group, or an amino group, an α,ω-dihydroxysiloxane oligomer, an α,ω-dialkoxysiloxane oligomer, an alkoxysilane, or the like, and a diphenyldialkylsiloxane and a silane coupling agent represented by the following general formula (2) in water using an anionic surfactant, and then optionally adding a catalyst such as an acid thereto to perform a polymerization reaction.

(2)

wherein $R^4$ is a mercapto group or a monovalent organic group having a polymerizable double bond, particularly an acryloxy group- or methacryloxy group-substituted alkyl group having 1 to 6 carbon atoms, a vinyl group, or a mercapto group. $R^5$ is an alkyl group having 1 to 4 carbon atoms. $R^6$ is an alkyl group having 1 to 4 carbon atoms, e is an integer of 2 or 3, f is an integer of 0 or 1, and e+f=2 or 3.

Examples of the cyclic organosiloxane include hexamethyl cyclotrisiloxane (D3), octamethyl cyclotetrasiloxane (D4), decamethyl cyclopentasiloxane (D5), dodecamethyl cyclohexasiloxane (D6), 1,1-diethylhexamethyl cyclotetrasiloxane, phenylheptamethyl cyclotetrasiloxane, 1,1-diphenylhexamethyl cyclotetrasiloxane, 1,3,5,7-tetravinyltetramethyl cyclotetrasiloxane, 1,3,5,7-tetramethyl cyclotetrasiloxane, 1,3,5,7-tetracyclohexyltetramethyl cyclotetrasiloxane, tris(3,3,3-trifluoropropyl)trimethyl cyclotrisiloxane, 1,3,5,7-tetra(3-methacryloxypropyl)tetramethyl cyclotetrasiloxane, 1,3,5,7-tetra(3-acryloxypropyl)tetramethyl cyclotetrasiloxane, 1,3,5,7-tetra(3-carboxypropyl)tetramethyl cyclotetrasiloxane, 1,3,5,7-tetra(3-vinyloxypropyl)tetramethyl cyclotetrasiloxane, 1,3,5,7-tetra (p-vinylphenyl)tetramethyl cyclotetrasiloxane, 1,3,5,7-tetra[3-(p-vinylphenyl) propyl]tetramethyl cyclotetrasiloxane, 1,3,5,7-tetra(N-acryloyl-N-methyl-3-aminopropyl) tetramethyl cyclotetrasiloxane, and 1,3,5,7-tetra(N,N-bis (lauroyl)-3-aminopropyl)tetramethyl cyclotetrasiloxane. Preferably, octamethyl cyclotetrasiloxane and decamethyl cyclopentasiloxane are used.

Specific examples of the silane coupling agent include a vinyl silane such as vinyl trimethoxysilane, vinyl triethoxysilane, vinyl tripropoxysilane, vinyl triisopropoxysilane, vinyl methyl dimethoxysilane, or vinyl methyl diethoxysilane; an acrylic silane such as γ-(meth)acryloxypropyl trimethoxysilane, γ-(meta)acryloxypropyl triethoxysilane, γ-(meta)acryloxypropyl tripropoxysilane, γ-(meta)acryloxypropyl triisopropoxysilane, γ-(meta)acryloxypropyl tributoxysilane, γ-(meta)acryloxypropyl methyldimethoxysilane, γ-(meta)acryloxypropyl methyldiethoxysilane, γ-(meta) acryloxypropyl methyldipropoxysilane, γ-(meta)acryloxypropyl methyldiisopropoxysilane, or γ-(meta)acryloxypropyl methyldibutoxysilane; and a mercaptosilane such as γ-mercaptopropylmethyl dimethoxysilane or γ-mercaptopropyl trimethoxysilane. Alternatively, an oligomer obtained by polycondensing these compounds may be more preferable because generation of an alcohol is suppressed. Here, (meth)acryloxy indicates acryloxy or methacryloxy. The silane coupling agent is preferably used in an amount of 0.01 to 20 parts by weight, more preferably 0.01 to 5 parts by weight per 100 parts by weight of the cyclic organosiloxane.

By copolymerizing the silane coupling agent, a polyorganosiloxane having "c" in the following formula is obtained, and an effect of grafting a monomer of the component (ii) or (iii) can be obtained.

[Chem. 3]

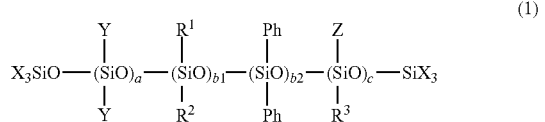

(1)

As a polymerization catalyst used for polymerization, it is only required to use a known polymerization catalyst. Particularly, a strong acid is preferable, and examples thereof include hydrochloric acid, sulfuric acid, dodecylbenzenesulfonic acid, citric acid, lactic acid, and ascorbic acid. Preferably, dodecylbenzenesulfonic acid having an emulsifying ability is used.

The amount of an acid catalyst used is preferably 0.01 to 10 parts by weight, and more preferably 0.2 to 2 parts by weight per 100 parts by weight of the cyclic organosiloxane.

Examples of the anionic surfactant serving as the surfactant at the time of polymerization include sodium lauryl sulfate, sodium laureth sulfate, sodium dialkyl succinate, sodium alkyl diphenyl ether disulfonate, dodecyl benzene sulfonic acid, an N-acyl amino acid salt, an N-acyl taurine salt, an aliphatic soap, and an alkyl phosphate. Particularly, a water-soluble compound free of a polyethylene oxide chain is preferable. An N-acyl amino acid salt, an N-acyl taurine salt, an aliphatic soap, and an alkyl phosphate are more preferable. Sodium alkyl diphenyl ether disulfonate and sodium lauryl sulfate are particularly preferable.

The used amount of the anionic surfactant is preferably 0.1 to 20 parts by weight, and more preferably 0.5 to 10 parts by weight per 100 parts by weight of the cyclic organosiloxane.

Polymerization temperature is preferably 50 to 75° C., and polymerization time is preferably at least 10 hours, and more preferably at least 15 hours. Furthermore, polymerization is preferably followed by aging at 5 to 30° C. for at least 10 hours.

The acrylic ester or methacrylic ester (ii) (hereinafter, also referred to as an acrylic component) used in the present invention refers to an acrylic ester monomer or a methacrylic ester monomer free of a functional group such as a hydroxyl group, an amide group, or a carboxyl group. An acrylic ester or a methacrylic ester having an alkyl group having 1 to 10 carbon atoms is preferable, and furthermore, a monomer having a glass transition temperature (hereinafter, also referred to as Tg) of an acrylic component polymer of 40° C. or higher, preferably 60° C. or higher is preferable. Examples of such a monomer include methyl methacrylate, isopropyl methacrylate, ethyl methacrylate, and cyclohexyl methacrylate. The upper limit of Tg is preferably up to 200° C., and more preferably up to 150° C.

The glass transition temperature can be measured based on JIS K7121.

The functional group-containing monomer (iii) copolymerizable with the component (ii) is a monomer having an unsaturated bond, having a carboxyl group, an amide group, a hydroxyl group, a vinyl group, an allyl group, or the like. Specific examples thereof include methacrylic acid, acrylic acid, acrylamide, allyl methacrylate, vinyl methacrylate, 2-hydroxyethyl methacrylate, and 2-hydroxypropyl methacrylate. By copolymerizing such a monomer, the polymer becomes more compatible.

The silicone acryl graft copolymer resin emulsion (III) of the present invention is obtained by subjecting a mixture including the polyorganosiloxane (i) obtained as described above, the (meth)acrylic ester monomer (ii), and the functional group-containing monomer (iii) copolymerizable with the component (ii) to emulsion graft polymerization.

A weight ratio of the polyorganosiloxane of formula (1) to the (meth)acrylic ester monomer (a weight ratio of the polyorganosiloxane of formula (1) to the (meth) acrylic unit) at the time of graft polymerization is 50:50 to 90:10, and preferably 50:50 to 80:20. If the silicone component is less than 50, a coating on the leather fails to improve wear resistance.

Examples of a radical initiator used herein include a persulfate such as potassium persulfate or ammonium persulfate, hydrogen persulfate, t-butyl hydroperoxide, and hydrogen peroxide. A redox-based initiator using a reducing agent such as acid sodium sulfite, Rongalit, L-ascorbic acid, tartaric acid, a saccharide, or an amine can also be used as necessary.

The surfactant already contained in the polyorganosiloxane emulsion can be sufficiently cause graft polymerization. However, as an anionic surfactant for improving stability, sodium lauryl sulfate, sodium laureth sulfate, an N-acyl amino acid salt, an N-acyl taurine salt, an aliphatic soap, an alkyl phosphate, and the like may be added. In addition, a nonionic emulsifier may be added, for example, polyoxyethylene lauryl ether and polyoxyethylene tridecyl ether.

Graft polymerization temperature of the components (ii) and (iii) with respect to the component (i) is preferably 25 to 55° C., and more preferably 25 to 40° C. Polymerization time is preferably 2 to 8 hours, and more preferably 3 to 6 hours.

Furthermore, a chain transfer agent may be added in order to adjust the molecular weight of a graft polymer and a graft ratio.

The silicone acryl graft copolymer resin emulsion (III) thus obtained is a polymer in which the components (ii) and (iii) are randomly grafted.

The solid content of the silicone acryl graft copolymer resin emulsion (III) is preferably 35 to 50% by weight. The silicone acryl graft copolymer resin emulsion (III) has a viscosity at 25° C. of preferably up to 500 mPa·s, more preferably 50 to 500 mPa·s. The viscosity may be measured with a rotational viscometer. The silicone acryl graft copolymer resin emulsion (III) preferably has an average particle size of 0.1 μm (i.e., 100 nm) to 0.5 μm (i.e., 500 nm). The average particle size can be measured with a laser diffraction/scattering type particle size distribution measuring device.

The compounding amount of the silicone acryl graft copolymer resin emulsion is 1 to 30% by weight, preferably 5 to 30% by weight, and more preferably 10 to 30% by weight as a solid content in the coating agent for leather. If the amount of the silicone acryl graft copolymer resin emulsion is less than 1% by weight, no improvement is observed in wear resistance disadvantageously. If the amount of the silicone acryl graft copolymer resin emulsion exceeds 30% by weight, whitening occurs, and wear resistance is reduced disadvantageously.

The coating agent for leather of the present invention is obtained by mixing the aqueous urethane resin (I), the matting agent (II), and the silicone acryl graft copolymer resin emulsion (III) under an aqueous system by a known mixing preparation method such as a propeller stirrer or a homogenizer. It is preferable that the matting agent (II) is dispersed in water using any well-known stirrer such as Disper.

In addition, the coating agent of the present invention may include an antioxidant, a colorant, an ultraviolet absorber, a light stabilizer, an antistatic agent, a plasticizer, a flame retardant, a thickener, a surfactant, an organic solvent such as a film forming aid, another resin, and the like as long as performance of the coating agent is not affected.

The coating agent for leather of the present invention is used for a natural leather, an artificial leather, and a synthetic leather. Any artificial leather or synthetic leather may be used, such as a urethane-based leather or a vinyl chloride-based leather. A urethane-based artificial leather or synthetic leather is preferable. As for the color of a leather, a leather having an RGB value of 0, 0, 0 to 152, 152, 152 or 0, 0, 230 to 101, 101, 270 can exhibit the effects of the present invention.

Applications of a leather product of the present invention are not particularly limited. For example, a leather product of the present invention serves as a material of a bag, clothes such as a coat, pants, a riding wear, a flight jacket, rider suits, and various work clothes, a bag, a belt, a suspender, shoes, a glove, a ball for a ball game, miscellaneous goods such as a wallet and a notebook, furniture, sanitary goods, outdoor tents, an interior material for a vehicle, a car seat, a seat and a grip for a motorcycle, a bicycle saddle, a carpet, a musical instrument such as a drum or a shamisen, packing, or the like.

A method for forming the coating agent for leather of the present invention is not particularly limited. Examples thereof include a coating method using various coaters such as a gravure coater, a bar coater, a blade coater, a roll coater, an air knife coater, a screen coater, a curtain coater, and a brush coater, spray coating, and dipping.

The coating amount of the coating agent for leather of the present invention is not particularly limited. Usually, it is only required to perform coating preferably within a range of 1 to 300 g/m$^2$, more preferably within a range of 5 to 100 μm$^2$ in terms of solid content from viewpoints of antifouling properties, workability, and the like, and to form a coating by air-drying or heat-drying at 100 to 200° C.

EXAMPLES

Hereinafter, the present invention is described specifically with reference to Manufacture Examples, Examples, and Comparative Examples, but the present invention is not limited to the following Examples. In the following examples, parts and % indicate parts by weight and % by weight, respectively. The molecular weight was determined from the specific viscosity of a toluene solution of an organopolysiloxane in a concentration of 1 g/100 ml.

Manufacture Example 1

A solution obtained by dissolving 360 g of octamethyl cyclotetrasiloxane, 240 g of diphenyldimethylsiloxane (manufactured by Shin-Etsu Chemical Co., Ltd.), 0.6 g of γ-methacryloxypropyl methyldiethoxysilane, and 12 g of sodium lauryl sulfate in 45 g of pure water, and a solution obtained by dissolving 6 g of dodecylbenzenesulfonic acid in 54 g of pure water were put in a 2 L polyethylene beaker, and uniformly emulsified with a homomixer. Thereafter, 400 g of water was gradually added thereto for dilution, and the resulting diluted solution was caused to pass through a high-pressure homogenizer twice at a pressure of 300 kgf/cm$^2$ to obtain a uniform white emulsion. This emulsion was transferred to a 2 L glass flask equipped with a stirrer, a thermometer, and a reflux condenser, subjected to a polymerization reaction at 55° C. for 10 to 20 hours, and then aged at 10° C. for 10 to 20 hours. Thereafter, the pH of the resulting solution was neutralized to the vicinity of neutrality with 12 g of a 10% sodium carbonate aqueous solution. This emulsion had a non-volatile content (solid content) of 46.4% after being dried at 105° C. for 3 hours, and an organopolysiloxane in the emulsion was a non-flowable soft gel. The amount of diphenylsiloxane was measured, and was found to be 19.3%. To this emulsion, 240 g of methyl methacrylate (MMA) was added dropwise over 3 to 5 hours, and a redox reaction was performed with a peroxide and a reducing agent at 30° C. to perform acryl graft copolymerization on silicone, thus obtaining a silicone acryl graft copolymer resin emulsion having a nonvolatile content of 44.5%. The silicone acryl graft copolymer resin emulsion was confirmed by Si—NMR to be a polymer belonging to the chemical structure of the above general formula (1).

Manufacture Example 2

A solution obtained by dissolving 360 g of octamethyl cyclotetrasiloxane, 240 g of diphenyldimethylsiloxane (manufactured by Shin-Etsu Chemical Co., Ltd.), 0.6 g of γ-methacryloxypropyl methyldiethoxysilane, and 18 g of sodium alkyl diphenyl ether disulfonate in 90 g of pure water, and a solution obtained by dissolving 6 g of dodecylbenzenesulfonic acid in 54 g of pure water were put in a 2 L polyethylene beaker, and uniformly emulsified with a homomixer. Thereafter, 400 g of water was gradually added thereto for dilution, and the resulting diluted solution was caused to pass through a high-pressure homogenizer twice at a pressure of 300 kgf/cm$^2$ to obtain a uniform white emulsion. This emulsion was transferred to a 2 L glass flask equipped with a stirrer, a thermometer, and a reflux condenser, subjected to a polymerization reaction at 55° C. for 10 to 20 hours, and then aged at 10° C. for 10 to 20 hours. Thereafter, the pH of the resulting solution was neutralized to the vicinity of neutrality with 12 g of a 10% sodium carbonate aqueous solution. This emulsion had a non-volatile content (solid content) of 46.6% after being dried at 105° C. for 3 hours, and an organopolysiloxane in the emulsion was a non-flowable soft gel. To this emulsion, 240 g of methyl methacrylate (MMA) was added dropwise over 3 to 5 hours, and a redox reaction was performed with a peroxide and a reducing agent at 30° C. to perform acryl graft copolymerization on silicone, thus obtaining a silicone acryl graft copolymer resin emulsion having a nonvolatile content of 45.0%.

Manufacture Example 3

A solution obtained by dissolving 100 g of octamethyl cyclotetrasiloxane, 500 g of diphenyldimethylsiloxane (manufactured by Shin-Etsu Chemical Co., Ltd.), 0.6 g of y-methacryloxypropyl methyldiethoxysilane, and 18 g of sodium alkyl diphenyl ether disulfonate in 100 g of pure water, and a solution obtained by dissolving 6 g of dodecylbenzenesulfonic acid in 54 g of pure water were put in a 2 L polyethylene beaker, and uniformly emulsified with a homomixer. Thereafter, 400 g of water was gradually added thereto for dilution, and the resulting diluted solution was caused to pass through a high-pressure homogenizer twice at a pressure of 300 kgf/cm$^2$ to obtain a uniform white emulsion. This emulsion was transferred to a 2 L glass flask equipped with a stirrer, a thermometer, and a reflux condenser, subjected to a polymerization reaction at 55° C. for 10 to 20 hours, and then aged at 10° C. for 10 to 20 hours. Thereafter, the pH of the resulting solution was neutralized to the vicinity of neutrality with 12 g of a 10% sodium carbonate aqueous solution. This emulsion had a non-volatile content (solid content) of 46.2% after being dried at 105° C. for 3 hours, and an organopolysiloxane in the emulsion was a non-flowable soft gel. To this emulsion, 240 g of methyl methacrylate (MMA) was added dropwise over 3 to 5 hours, and a redox reaction was performed with a peroxide and a reducing agent at 30° C. to perform acryl graft copolymerization on silicone, thus obtaining a silicone acryl graft copolymer resin emulsion having a nonvolatile content of 44.6%.

Manufacture Example 4

A solution obtained by dissolving 300 g of octamethyl cyclotetrasiloxane, 300 g of diphenyldimethylsiloxane (manufactured by Shin-Etsu Chemical Co., Ltd.), 0.6 g of y-methacryloxypropyl methyldiethoxysilane, and 18 g of sodium alkyl diphenyl ether disulfonate in 100 g of pure water, and a solution obtained by dissolving 6 g of dodecylbenzenesulfonic acid in 54 g of pure water were put in a 2 L polyethylene beaker, and uniformly emulsified with a homomixer. Thereafter, 400 g of water was gradually added thereto for dilution, and the resulting diluted solution was caused to pass through a high-pressure homogenizer twice at a pressure of 300 kgf/cm$^2$ to obtain a uniform white emulsion. This emulsion was transferred to a 2 L glass flask equipped with a stirrer, a thermometer, and a reflux condenser, subjected to a polymerization reaction at 55° C. for 10 to 20 hours, and then aged at 10° C. for 10 to 20 hours. Thereafter, the pH of the resulting solution was neutralized to the vicinity of neutrality with 12 g of a 10% sodium carbonate aqueous solution. This emulsion had a non-volatile content (solid content) of 46.4% after being dried at 105° C. for 3 hours, and an organopolysiloxane in the emulsion was a non-flowable soft gel. To this emulsion, 240 g of methyl methacrylate (MMA) was added dropwise over 3 to 5 hours, and a redox reaction was performed with a peroxide and a reducing agent at 30° C. to perform acryl graft copolymerization on silicone, thus obtaining a silicone acryl graft copolymer resin emulsion having a nonvolatile content of 44.6%.

Manufacture Example 5

A solution obtained by dissolving 360 g of octamethyl cyclotetrasiloxane, 240 g of diphenyldimethylsiloxane (manufactured by Shin-Etsu Chemical Co., Ltd.), 0.6 g of γ-methacryloxypropyl methyldiethoxysilane, and 18 g of sodium alkyl diphenyl ether disulfonate in 100 g of pure water, and a solution obtained by dissolving 6 g of dodecylbenzenesulfonic acid in 54 g of pure water were put in a 2 L polyethylene beaker, and uniformly emulsified with a homomixer. Thereafter, 400 g of water was gradually added thereto for dilution, and the resulting diluted solution was caused to pass through a high-pressure homogenizer twice at a pressure of 300 kgf/cm$^2$ to obtain a uniform white emulsion. This emulsion was transferred to a 2 L glass flask equipped with a stirrer, a thermometer, and a reflux condenser, subjected to a polymerization reaction at 55° C. for 10 to 20 hours, and then aged at 10° C. for 10 to 20 hours. Thereafter, the pH of the resulting solution was neutralized to the vicinity of neutrality with 12 g of a 10% sodium carbonate aqueous solution. This emulsion had a non-volatile content (solid content) of 46.2% after being dried at 105° C. for 3 hours, and an organopolysiloxane in the emulsion was a non-flowable soft gel. To this emulsion, 600 g of methyl methacrylate (MMA) was added dropwise over 3 to 5 hours, and a redox reaction was performed with a peroxide and a reducing agent at 30° C. to perform acryl graft copolymerization on silicone, thus obtaining a silicone acryl graft copolymer resin emulsion having a nonvolatile content of 45.1%.

Comparative Manufacture Example 1

A solution obtained by dissolving 600 g of octamethyl cyclotetrasiloxane, 0.60 g of γ-methacryloxypropyl methyldiethoxysilane, and 5 g of sodium lauryl sulfate in 45 g of pure water, and a solution obtained by dissolving 5 g of dodecylbenzenesulfonic acid in 45 g of pure water were put in a 2 L polyethylene beaker, and uniformly emulsified with a homomixer. Thereafter, 500 g of water was gradually added thereto for dilution, and the resulting diluted solution was caused to pass through a high-pressure homogenizer twice at a pressure of 300 kgf/cm$^2$ to obtain a uniform white emulsion. This emulsion was transferred to a 2 L glass flask equipped with a stirrer, a thermometer, and a reflux condenser, subjected to a polymerization reaction at 55° C. for 24 hours, and then aged at 0° C. for 24 hours. Thereafter, the resulting solution was neutralized to the vicinity of neutrality with 12 g of a 10% sodium carbonate aqueous solution. To this emulsion, 66 g of methyl methacrylate (MMA) was added dropwise over 3 to 5 hours, and a redox reaction was performed with a peroxide and a reducing agent at 30° C. to perform acryl graft copolymerization on silicone, thus obtaining a silicone acryl graft copolymer resin emulsion having a nonvolatile content of 44.8%.

Manufacture Example 6

A solution obtained by dissolving 480 g of octamethyl cyclotetrasiloxane, 120 g of diphenyldimethylsiloxane (manufactured by Shin-Etsu Chemical Co., Ltd.), 0.60 g of γ-methacryloxypropyl methyldiethoxysilane, and 18 g of sodium alkyl diphenyl ether disulfonate in 100 g of pure water, and a solution obtained by dissolving 5 g of dodecylbenzenesulfonic acid in 45 g of pure water were put in a 2 L polyethylene beaker, and uniformly emulsified with a homomixer. Thereafter, 400 g of water was gradually added thereto for dilution, and the resulting diluted solution was caused to pass through a high-pressure homogenizer twice at a pressure of 300 kgf/cm$^2$ to obtain a uniform white emulsion. This emulsion was transferred to a 2 L glass flask equipped with a stirrer, a thermometer, and a reflux condenser, subjected to a polymerization reaction at 55° C. for 24 hours, and then aged at 0° C. for 24 hours. Thereafter, the resulting solution was neutralized to the vicinity of neutrality with 12 g of a 10% sodium carbonate aqueous solution. To this emulsion, 79 g of styrene and 161 g of MMA were added dropwise over 3 to 5 hours, and a redox reaction was performed with a peroxide and a reducing agent at 30° C. to perform acryl graft copolymerization on silicone, thus obtaining a silicone acryl graft copolymer resin emulsion having a nonvolatile content of 44.8%.

Comparative Manufacture Example 2

A solution obtained by dissolving 600 g of octamethyl cyclotetrasiloxane, 0.60 g of γ-methacryloxypropyl methyldiethoxysilane, and 18 g of sodium alkyl diphenyl ether disulfonate in 100 g of pure water, and a solution obtained by dissolving 5 g of dodecylbenzenesulfonic acid in 45 g of pure water were put in a 2 L polyethylene beaker, and uniformly emulsified with a homomixer. Thereafter, 500 g of water was gradually added thereto for dilution, and the resulting diluted solution was caused to pass through a high-pressure homogenizer twice at a pressure of 300 kgf/cm$^2$ to obtain a uniform white emulsion. This emulsion was transferred to a 2 L glass flask equipped with a stirrer, a thermometer, and a reflux condenser, subjected to a polymerization reaction at 55° C. for 24 hours, and then aged at 0° C. for 24 hours. Thereafter, the resulting solution was neutralized to the vicinity of neutrality with 12 g of a 10% sodium carbonate aqueous solution. To this emulsion, 71 g of styrene and 169 g of MMA were added dropwise over 3 to 5 hours, and a redox reaction was performed with a peroxide and a reducing agent at 30° C. to perform acryl graft copolymerization on silicone, thus obtaining a silicone acryl graft copolymer resin emulsion having a nonvolatile content of 44.8%.

Comparative Manufacture Example 3

A silicone resin emulsion was obtained in a similar manner to Manufacture Example 2 except that methyl methacrylate (MMA) was not copolymerized with the organopolysiloxane obtained in Manufacture Example 2.

<Solid Content Measurement Method>

Approximately 1 g of a resin emulsion (sample) in each example was accurately weighed into an aluminum foil dish, put in a dryer maintained at about 105° C., heated for one hour, then taken out of the dryer, and cooled by air in a desiccator. The sample was weighed after being dried, and an evaporation residue was calculated by the following formula.

$$R = \frac{T - L}{W - L} \times 100 \qquad \text{[Math. 1]}$$

R: Evaporation residue (%)
W: Weight (g) of an aluminum foil dish containing a sample before drying
L: Weight of an aluminum foil dish (g)
T: Weight (g) of an aluminum foil dish containing a dried sample
Size of an aluminum foil dish: 70 Φ×12 h (mm)

<Viscosity Measurement Method>

The liquid temperature of a resin emulsion (sample) in each example was maintained at 23±0.5° C., and the viscosity was measured with a BM type viscometer (No. 1 rotor, 6 rpm).

<Emulsion Average Particle Size Measurement Method>

The particle size of a resin emulsion in each example was measured using a laser diffraction/scattering type particle size measuring device (LA950V2) manufactured by Horiba, Ltd.

<Refractive Index>

20 g of the resin emulsion was dried at 105° C. for six hours. The evaporation residue was dissolved in a toluene solution so as to be a concentration of 7%, and the refractive index thereof was measured at 25° C. For the measurement, a digital refractometer RX-7000a (manufactured by Atago Co., Ltd.) was used.

<Haze Value>

To an aqueous polycarbonate-based urethane resin (EDOLAN CM), each of Manufacture Examples 1 to 6 and Comparative Manufacture Examples 1 to 3 was added at 10% in solid content. A slide glass was coated with the resulting mixture at 25 g/m$^2$ using a No. 20 bar coater, and drying was performed at 150° C. for one minute. The slide glass had a haze value of 0.8%, and "EDOLAN CM" alone had a haze value of 2.0% and was transparent. The haze value was measured using NDH7000 (manufactured by Nippon Denshoku Industries Co., Ltd.).

The emulsions obtained in Manufacture Examples 1 to 6 and Comparative Manufacture Examples 1 to 3 were evaluated by the following method. The results thereof are illustrated in Table 1. It is noted that a compounding ratio in Table 1 below indicates parts by weight of each component when the total amount of organosiloxane is 100 parts by weight.

TABLE 1

| | Manufacture Example | | | | | Comparative Manufacture Example | Manufacture Example | Comparative Manufacture Example | |
|---|---|---|---|---|---|---|---|---|---|
| | 1 | 2 | 3 | 4 | 5 | 1 | 6 | 2 | 3 |
| Octamethyl cyclotetrasiloxane | 60 | 60 | 17 | 50 | 60 | 100 | 80 | 100 | 60 |
| Diphenyldimethylsiloxane | 40 | 40 | 83 | 50 | 40 | — | 20 | — | 40 |
| γ-Methacryloxypropyl methyldiethoxysilane | 0.1 | 0.1 | 0.1 | 0.1 | 0.1 | 0.1 | 0.1 | 0.1 | 0.1 |
| Amount of diphenylsiloxane (% by weight) | 19.3 | 19.3 | 41.5 | 29.1 | 19.3 | 0 | 11 | 0 | 19.3 |
| Styrene | — | — | — | — | — | — | 13 | 12 | — |
| MMA | 40 | 40 | 40 | 40 | 100 | 11 | 27 | 28 | — |
| Sodium lauryl sulfate | 2 | — | — | — | — | 1 | — | 1 | — |
| Sodium alkyl diphenyl ether disulfonate | — | 3 | 3 | 3 | 3 | — | 3 | — | 3 |
| Solid content (%) | 45 | 45 | 45 | 45 | 45 | 45 | 45 | 45 | 46 |
| Viscosity (mPa·s) | 70 | 80 | 50 | 70 | 80 | 80 | 70 | 60 | 60 |
| Average particle size (nm) | 300 | 350 | 800 | 400 | 350 | 300 | 300 | 300 | 350 |
| Refractive index | 1.4919 | 1.4919 | 1.4935 | 1.4928 | 1.4922 | 1.4891 | 1.4905 | 1.4908 | 1.4908 |
| Haze value (%) | 5.0 | 4.9 | 3.4 | 4.0 | 5.1 | 11.0 | 8.2 | 16.2 | 8.1 |

In the following Examples and Comparative Examples, coating and performance of a coating agent were evaluated.

Example 1

A urethane artificial leather manufactured by DIC (RGB value: 25, 30, 25) was coated with a mixture including an aqueous dispersion of matting agent silica (SYLYSIA 550), an aqueous polycarbonate-based urethane resin (EDOLAN CM), and the silicone acryl graft copolymer resin emulsion of Manufacture Example 1 at the solid content ratio illustrated in Table 2 at 31 g/m² (20 μm as a dried coating film) using a No. 20 bar coater, and drying was performed at 150° C. for one minute.

The obtained leather was evaluated by the following method. Results thereof are illustrated in Table 2.

<Whitening>

The leather obtained by coating was visually evaluated.

⊚: There is no difference from non-addition

○: No whitening is observed, but an appearance is slightly inferior to that of no-addition Δ: groove is whitened x: Whitening is observed as a whole (Note that whitening of a groove means that the thickness of a coating film in a recess is inevitably increased in a cross section of an uneven leather, and this portion looks white.)

<Wear Resistance>

The leather coated in an area of about 3 cm×about 25 cm was cut. A cotton cloth was attached to a Gakushin wear tester, a load of 500 g was applied, and the number of times until a surface was changed was noted. As for the number of times, one round trip was counted as one time. The larger the number of times is, the better the wear resistance is.

Examples 2 to 8 and Comparative Examples 1 to 4

Compounding was performed at the ratios illustrated in Table 2, and evaluation was performed in a similar manner to Example 1. The results thereof are illustrated in Table 2.

Example 9

Example 9 was performed in a similar manner to Example 1 except that a black vinyl chloride resin film having a degree of polymerization of 1300 (thickness: about 200 μm/RGB value: 30, 30, 40) and manufactured by using Labo Plastomill and T-die was used instead of the urethane artificial leather manufactured by DIC (RGB value: 25, 30, 25). Evaluation of Example 9 is illustrated in Table 2.

Comparative Example 5

Comparative Example 5 was performed in a similar manner to Comparative Example 1 except that a black vinyl chloride resin film having a degree of polymerization of 1300 (thickness: about 200 μm/RGB value: 30, 30, 40) and manufactured by using Labo Plastomill and T-die was used instead of the urethane artificial leather manufactured by DIC (RGB value: 25, 30, 25). Evaluation of Comparative Example 5 is illustrated in Table 2.

Comparative Example 6

Comparative Example 6 was performed in a similar manner to Comparative Example 4 except that a black vinyl chloride resin film having a degree of polymerization of 1300 (thickness: about 200 μm/RGB value: 30, 30, 40) and manufactured by using Labo Plastomill and T-die was used instead of the urethane artificial leather manufactured by DIC (RGB value: 25, 30, 25). Evaluation of Comparative Example 6 is illustrated in Table 2.

TABLE 2

| | | Example | | | | | | | | | Comparative Example | | | | | |
|---|---|---|---|---|---|---|---|---|---|---|---|---|---|---|---|---|
| | | 1 | 2 | 3 | 4 | 5 | 6 | 7 | 8 | 9 | 1 | 2 | 3 | 4 | 5 | 6 |
| Type of leather | | U | U | U | U | U | U | U | U | V | U | U | U | U | V | V |
| Coating agent (% by weight) | EDOLAN CM | 70 | 70 | 70 | 70 | 70 | 70 | 70 | 55 | 70 | 70 | 70 | 70 | 40 | 70 | 40 |
| | SYLYSIA 550 | 20 | 20 | 20 | 20 | 20 | 20 | 28 | 20 | 20 | 20 | 20 | 20 | 50 | 20 | 50 |
| | Manufacture Example 1 | 10 | | | | | | 2 | 25 | 10 | | | | 10 | | 10 |
| | Manufacture Example 2 | | 10 | | | | | | | | | | | | | |
| | Manufacture Example 3 | | | 10 | | | | | | | | | | | | |
| | Manufacture Example 4 | | | | 10 | | | | | | | | | | | |
| | Manufacture Example 5 | | | | | 10 | | | | | | | | | | |
| | Manufacture Example 6 | | | | | | 10 | | | | | | | | | |
| | Comparative Manufacture Example 1 | | | | | | | | | | 10 | | | | 10 | |
| | Comparative Manufacture Example 2 | | | | | | | | | | | 10 | | | | |
| | Comparative Manufacture Example 3 | | | | | | | | | | | | 10 | | | |
| Evaluation | Whitening | ◎ | ◎ | ◎ | ◎ | ◎ | ○ | ◎ | ◎ | ◎ | Δ | Δ | Δ | X | Δ | X |
| | Wear resistance (number of times) | 5,400 | 4,600 | 5,800 | 6,200 | 6,000 | 5,200 | 3,800 | 7,500 | 7,100 | 4,800 | 5,200 | 4,900 | 350 | 4,200 | 210 |

U: Urethane artificial leather
V: Vinyl chloride film

"EDOLAN CM": Aqueous polycarbonate-based urethane resin manufactured by Tanatex Chemicals Japan The viscosity of the "EDOLAN CM" was measured with a BM type viscometer (6 rpm, 25° C., No. 2 rotor), and was found to be 500 mPa·s.

"SYLYSIA 550": Silica manufactured by Fuji Silysia Chemical Ltd. (average particle size: 4 μm, pore volume: 0.8 ml/g)

The above average particle size and pore volume were measured by JIS K1150 (pore volume: method using nitrogen adsorption isotherm, average particle size: laser diffraction type particle size distribution measuring method).

As illustrated in Table 2, the coating agent for leather of the present invention (Examples 1 to 9) is aqueous, is excellent in terms of coating environment and environmental load, and can further impart wear resistance, anti-fouling properties, and an anti-whitening function to various types of leathers.

The invention claimed is:

1. A coating agent for leather, the coating agent comprising:
in terms of solid content ratio,
(I) 50 to 80% by weight of an aqueous urethane resin;
(II) 10 to 40% by weight of a matting agent; and
(III) 1 to 30% by weight of a silicone acryl graft copolymer resin emulsion having a polyorganosiloxane represented by the following formula (1) and acrylic ester units or methacrylic ester units in which the weight ratio of the polyorganosiloxane relative to the acrylic ester units or the methacrylic ester units is 50:50 to 90:10 (as a solid content):

[Chem. 1]

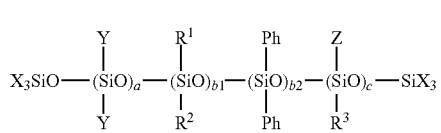

(1)

wherein 1e and $R^2$ are identical or different and each represent a substituted or unsubstituted monovalent hydrocarbon group having 1 to 20 carbon atoms (excluding a phenyl group), Ph is a phenyl group, $R^3$ is a mercapto group-, acryloxy group-, or methacryloxy group- substituted alkyl group having 1 to 6 carbon atoms, or a vinyl group, X are identical or different and each represent a substituted or unsubstituted monovalent hydrocarbon group having 1 to 20 carbon atoms, Y are identical or different and each represent X or $-[O-Si(X)_2]_d-X$, at least two of X and Y being hydroxyl groups, Z is an alkyl group having 1 to 4 carbon atoms, an alkoxy group having 1 to 4 carbon atoms, or a hydroxyl group, "a" is a number of 0 to 1,000, "b1" is a positive number of 90 to 6,000, "b2" is a positive number of 1 to 4,000, "b1+b2" is a positive number of 91 to 10,000, "c" is a positive number of 1 to 50, and "d" is a positive number of 1 to 1,000, wherein the amount of diphenylsiloxane in the polyorganosiloxane represented by the general formula (1) is 15% by weight or more and 85% by weight or less.

2. The coating agent for leather according to claim 1, wherein the silicone acryl graft copolymer resin emulsion (III) is an emulsion graft copolymer of:
(i) a polyorganosiloxane represented by the general formula (1); and
(ii) an acrylic ester monomer or a methacrylic ester monomer.

3. The coating agent for leather according to claim 1, wherein the aqueous urethane resin is a polycarbonate-based urethane resin.

4. The coating agent for leather according to claim 1, wherein the matting agent is selected from silica, silicone powder, acrylic powder, and urethane powder.

5. The coating agent for leather according to claim 1, wherein the silicone acryl graft copolymer resin emulsion has a solid content of 1 to 30% by weight and a viscosity of 500 mPa·s or less at 25° C.

6. A leather on which a coating by the coating agent for leather according to claim 1 is formed.

7. The coating agent for leather according to claim 1, wherein the silicone acryl graft copolymer resin emulsion (III) is an emulsion graft copolymer of:

(i) a polyorganosiloxane represented by the general formula (1);
(ii) an acrylic ester monomer or a methacrylic ester monomer; and
(iii) a functional group-containing monomer copolymerizable with the component (ii).

* * * * *